(No Model.) 3 Sheets—Sheet 1.
M. BRECKHEIMER.
ICE HARVESTING AND ICE LOADING MACHINE.
No. 285,791. Patented Oct. 2, 1883.

Witnesses:
Philip H. Perkins
Charles J. King

Inventor:
Matthias Breckheimer (No Model.) 3 Sheets—Sheet 2.

M. BRECKHEIMER.
ICE HARVESTING AND ICE LOADING MACHINE.

No. 285,791. Patented Oct. 2. 1883.

Witnesses:
Philip H. Perkins
Charles I. King

Inventor:
Matthias Breckheimer (No Model.)  3 Sheets—Sheet 3.

M. BRECKHEIMER.
ICE HARVESTING AND ICE LOADING MACHINE.

No. 285,791. Patented Oct. 2, 1883.

Fig. 3.

Witnesses:
Philip H. Perkins
Charles J. King

Inventor:
Matthias Breckheimer

UNITED STATES PATENT OFFICE.

MATTHIAS BRECKHEIMER, OF MADISON, WISCONSIN.

ICE-HARVESTING AND ICE-LOADING MACHINE.

SPECIFICATION forming part of Letters Patent No. 285,791, dated October 2, 1883.

Application filed July 24, 1883. (No model.)

*To all whom it may concern:*

Be it known that I, MATTHIAS BRECKHEIMER, a citizen of the United States, residing at Madison, in the county of Dane and State of Wisconsin, have invented a new and useful Ice-Harvesting and Ice-Loading Machine, of which the following is a specification.

My invention relates to an improvement in ice-loading and ice-harvesting machines, in which an iron-frame scoop, G, attached to a lever-arm, L, and a horizontal axis, E, dips into the water and lifts the ice-cakes previously cut into proper dimensions into and upon an inclined chute or channel, C $c$ $f$, whence it is discharged at will into carts and wagons for transportation.

The object of my invention is to provide, first, a method by which at least fifty percentum of labor is saved over the methods now used for the same purpose; second, to obviate to a great extent the necessity of exposing men and animals to cold and wet in harvesting ice; third, to utilize horse-power to a greater advantage in harvesting ice; fourth, the same machine may be used for loading and unloading boxes and barrels. I attain these objects by the mechanism illustrated in the accompanying drawings, in which similar letters refer to similar parts throughout the several views.

Figure 1:
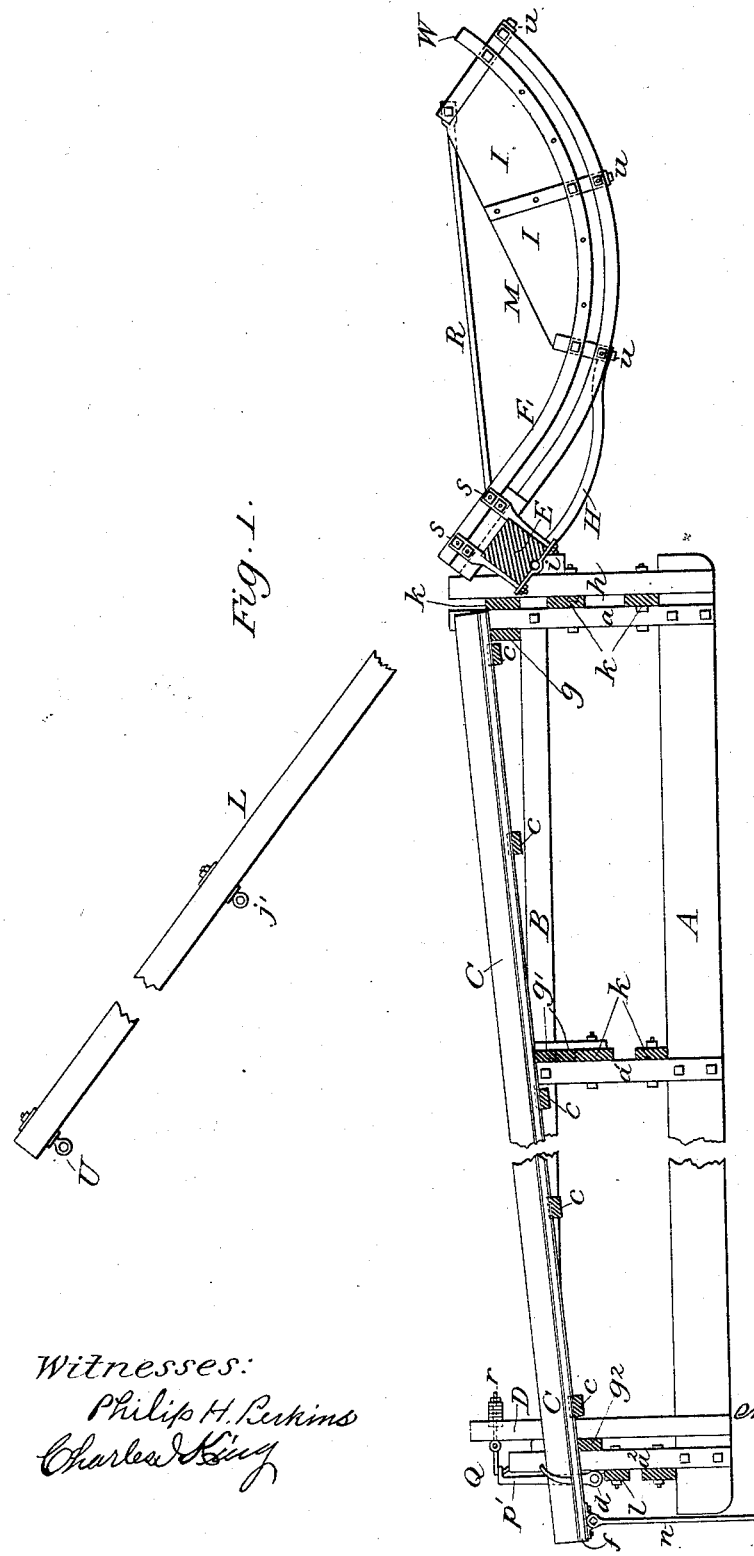
Figure 2:
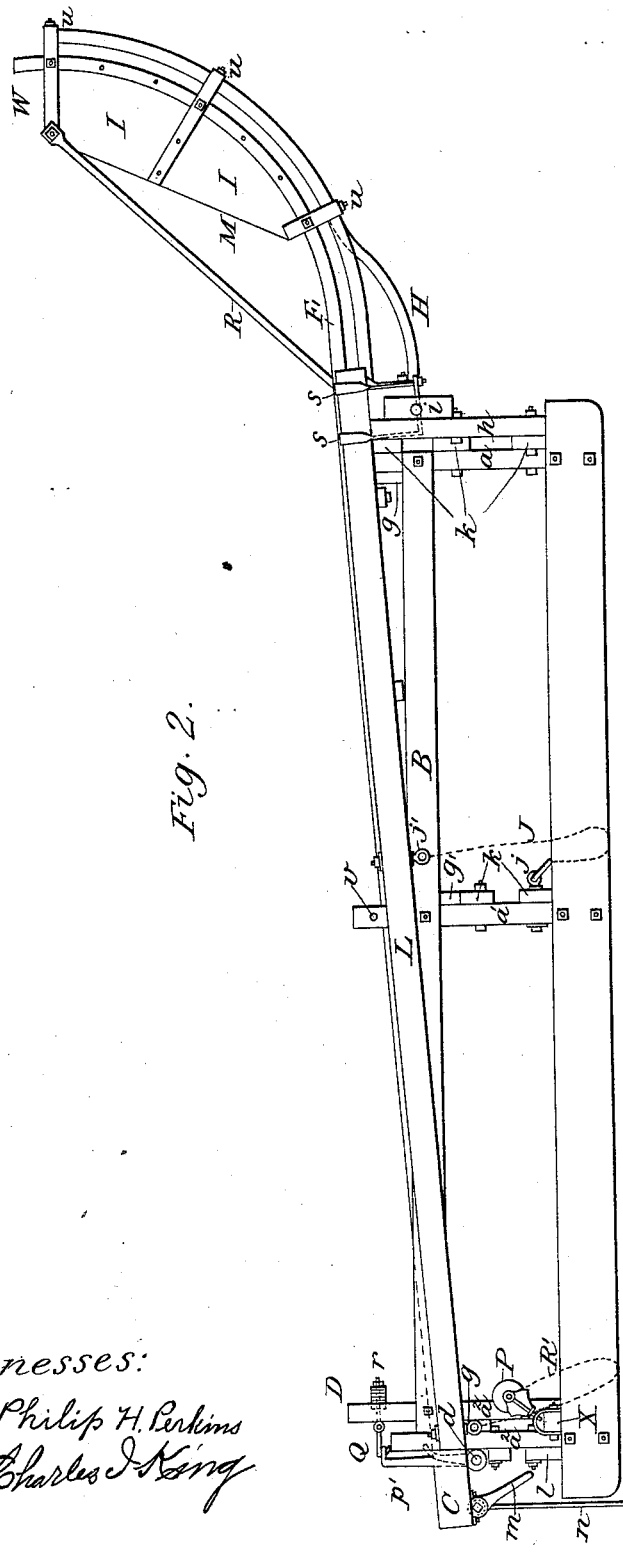

Figures 1 and 2 are vertical sections of the entire machine, the first being an interior and the second an exterior view. The view in Fig. 1 represents a vertical section passing longitudinally through the middle of the machine. Fig. 3 is a top view of the machine as it appears when the scoop and lever are in position shown in side view, Fig. 2.

A B $a$ $a_2$ is an upright wooden frame, which may be from three to five feet high and from twelve to fifteen feet long, or thereabout, as circumstances may require. The shoe or runner A is rounded at either end, so that, if desired, it may operate as a sled-runner in dragging the machine from place to place. At each end and across the middle the upright portion is strengthened by the transverse pieces $k$, bolted to the uprights $a$, and cross-sections of which are shown in Figs. 1 and 2.

The parts respectively lettered C $c$ $f$ (shown in the top view, Fig. 3) constitute a separate, adjustable, detachable frame, with as much inclination as necessary for allowing the ice to slide down the channel by its own weight. C C are single wooden strips constituting the sides of the channel, and shown in side view or vertical projection in Fig. 1. These side pieces, C, are fastened to the bottom strips, $c$, all of wood. These parts will be seen in top view, Fig. 3, and by end view in cross-section, Fig. 1. The parts $f$, Fig. 3, are the sliding ways proper for the ice, and it is found very convenient for this purpose, as well as cheap and practical, to use gas-pipe, although solid metal strips or wooden strips covered with metal might be used in the same capacity. It is a matter of experience, however, that ice will not slide as easily on wood as on metal. This gas-pipe $f$ is shown in longitudinal section, side view, Fig. 1. The inclined channel or chute C $c$ $f$ rests on the cross-pieces $g$ $g$ $g_2$. (See end views of these cross-pieces, Figs. 1 and 2, and top view of same, Fig. 3.) The cross-pieces $g$ and $g_2$ are not permanent, and by removing them the pitch of the ice-chute is regulated at will.

T is an iron shaft, the axle of which passes through two blocks at each of its extremities, attached to the standards $a_2$ at the end of the upright frame, already described. Attached rigidly to this shaft are two arms, $p$ $p$. (Shown in top view, Fig. 3, and by dotted lines in side view, Figs. 1 and 2.) At one extremity of the shaft T (shown at $p$, Fig. 2) another arm, $p$, is firmly attached to this axis T. This arm extends upward and is bent over to form an eye for the reception of the hook Q. The shank of Q passes through the upright D and terminates in a bolt-head at $r$, which acts against a metal or a rubber spring. The short arms $p$ $p$ extend upward far enough to catch the ice as it slides down the channel, and so hold it there until the wagon or cart into which it is to be loaded is ready to receive it. The purpose of the spring at $r$ is to diminish the force of impact of the ice-cakes against the arms $p$ $p$.

S is another shaft passing through the side pieces, C, of the chute. (See Fig. 3.) Rigidly attached to S are two arms, $n$ $n$, made of iron. When not in use, they hang in the position shown in Fig. 2. The purpose of these arms is to facilitate the discharge of ice from the chute into the cart or wagon on which the ice is to be loaded. This is effected by simply covering the distance between the end of the chute and the end or side of the wagon by turning the shaft S with the wrench $m$ until the iron arms $n$ rest upon the side or floor of the ice-cart.

I do not wish to limit myself to the actual number of pieces $c$ and $f$ shown in the top view. There might be cases where a greater number of these parts would be desirable.

The scoop G consists of a series of parallel curved irons or fingers, $w$, bolted securely to the wooden shaft E and strengthened by the cross-pieces F. The braces H, secured in a similar manner to the under side of E, are fastened by nut and bolt to the curved iron fingers at the intersection of the first cross-piece F. For reasons similar to those already given, I do not wish to restrict myself to the actual number of fingers and cross-pieces F shown in the drawings. (See top view, Fig. 3.) The rod R, with nut and bolt attachment at each end, Fig. 2, is used as a strengthening-rod. There are but two curved iron guides F—one on either side of the scoop G—both of which are bent outward at W, so that when the scoop is lowered into the water it will the more readily catch floating cakes of ice. The standards $n$ are simply the cross-pieces F bent upward. To these pieces and the upper curved iron F, sheet-iron is bolted or riveted, the upper edge of which is shown by the slant line M, Fig. 2. The lower edge of the sheet-iron falls below the upper edge of the curved iron G. The sheet-iron and the curved piece F act as guards to prevent the ice from slipping out either side before it can be landed onto the sliding-way. The parts of this scoop may be either of iron or of wood, or iron and wood combined; but I prefer to make them all of iron, as described.

The axle E rotates on iron pins passing through the blocks $i$. The wooden lever-arm L is attached to one end of this axle E by means of the iron straps and bolts shown at $s$ $s$, Fig. 2. When not in use, the lever-arm L and the scoop G may be kept in the position shown in Fig. 2 by simply placing a pin over the lever-arm L into the hole $v$. When in use, the depth of dip of the scoop G into the water will be governed by the thickness of the ice. This having been ascertained, the scoop, when at its lowest position, can be held there by the line J, Fig. 2, attached to the lever L at $j$, and to a ring-bolt, $j'$, at the other extremity, fastened into the cross-piece $k$. A ring-bolt is fastened into the extremity of the arm L, as shown at N, Fig. 1. To this is fastened a rope, R, which then passes through the pulley-block P. The force applied to the rope may be either horse or man power, as desired. The process of loading the ice is now apparent. The lever-arm L being released from its fastening at $v$, the iron-frame scoop falls by its own weight into the water. The amount of dip will be regulated by the rope or chain J.

I am aware that prior to my invention the principle of the iron scoop G has been employed in ice-elevators and other machines, and I do not claim this part of my invention as new.

I am also aware that the detachable sliding way C $f$ $c$ is not new; nor do I claim the shaft S and its attachments as new and patentable.

What I claim is—

In an ice-loading machine, the combination of the scoop G, attached to the lever-arm L, with the detachable and adjustable inclined chute C $f$ $c$, substantially as described.

MATTHIAS BRECKHEIMER.

Witnesses:
C. W. HEYL,
P. H. PERKINS.